(12) United States Patent
Keller

(10) Patent No.: US 12,253,627 B2
(45) Date of Patent: Mar. 18, 2025

(54) QUICK-MOUNT LASER WARNING RECEIVER

(71) Applicant: Raytheon Company, Arlington, VA (US)

(72) Inventor: Sean D. Keller, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 7 days.

(21) Appl. No.: 17/961,185

(22) Filed: Oct. 6, 2022

(65) Prior Publication Data

US 2024/0118388 A1   Apr. 11, 2024

(51) Int. Cl.
| | |
|---|---|
| *G01S 7/48* | (2006.01) |
| *G01S 7/481* | (2006.01) |
| *G01S 7/51* | (2006.01) |
| *G01S 17/88* | (2006.01) |

(52) U.S. Cl.
CPC .......... *G01S 7/4804* (2013.01); *G01S 7/4816* (2013.01); *G01S 7/51* (2013.01); *G01S 17/88* (2013.01)

(58) Field of Classification Search
CPC ........ G01S 7/4804; G01S 7/4816; G01S 7/51; G01S 17/88; B64D 7/00; B64D 45/00
See application file for complete search history.

(56) References Cited

U.S. PATENT DOCUMENTS

| | | | |
|---|---|---|---|
| 5,260,563 A | 11/1993 | Hunter et al. | |
| 5,525,989 A | 6/1996 | Holt | |
| 7,253,895 B2 | 8/2007 | Kauffman et al. | |
| 7,456,940 B2 | 11/2008 | Crow et al. | |
| 7,850,133 B2 | 12/2010 | Carnevali | |
| 7,975,971 B2 | 7/2011 | Carnevali | |
| 8,917,390 B2 | 12/2014 | Behr et al. | |
| 10,739,454 B2 | 8/2020 | Choiniere et al. | |
| 11,747,445 B2 | 9/2023 | Keller et al. | |
| 2001/0005804 A1 | 6/2001 | Rayner | |
| 2004/0099775 A1 | 5/2004 | Zheng et al. | |
| 2006/0082772 A1 | 4/2006 | Kehoe et al. | |
| 2011/0163897 A1* | 7/2011 | Russo | F41H 11/02 340/945 |
| 2014/0300973 A1 | 10/2014 | Neil | |

(Continued)

FOREIGN PATENT DOCUMENTS

WO   WO-2023028141 A1   3/2023

OTHER PUBLICATIONS

De 112010002799T5 machine translation (Year: 2012).*

(Continued)

*Primary Examiner* — Seung C Sohn
(74) *Attorney, Agent, or Firm* — Schwegman Lundberg & Woessner, P.A.

(57) ABSTRACT

A laser warning receiver that can be detachably mounted on the inside of a window of a manned platform to detect laser threats within its field-of-view (FOV) and to provide visual or audio warnings to the human occupant. The LWR is fully self-contained and independent of any systems on the manned platform. In different packaging configurations, the receiver's FOV can be manually rotated to better visualize the threat and/or the receiver's human-machine interface (HMIF) can be manually rotated to better display the warnings. Although most typically used in manned aircraft the LWR can be used in other manned vehicles or ships.

19 Claims, 16 Drawing Sheets

(56) References Cited

U.S. PATENT DOCUMENTS

| | | | |
|---|---|---|---|
| 2016/0209266 A1* | 7/2016 | McNeish | G01J 1/4257 |
| 2019/0094362 A1 | 3/2019 | Choiniere et al. | |
| 2021/0080403 A1 | 3/2021 | Yoshida et al. | |
| 2023/0068495 A1 | 3/2023 | Keller et al. | |

OTHER PUBLICATIONS

"U.S. Appl. No. 17/411,859, Notice of Allowance mailed May 17, 2023", 10 pgs.

"U.S. Appl. No. 17/411,859, PTO Response to Rule 312 Communication mailed Jun. 26, 2023", 2 pgs.

"International Application Serial No. PCT US2023 034186, International Search Report mailed Jan. 30, 2024", 5 pgs.

"International Application Serial No. PCT US2023 034186, Written Opinion mailed Jan. 30, 2024", 10 pgs.

"International Application Serial No. PCT US2022 041372, International Preliminary Report on Patentability mailed Mar. 7, 2024", 11 pgs.

Chen, Wei Ting, et al., "Flat optics with dispersion-engineered metasurfaces", Nature Reviews Materials 5, (Jun. 19, 2020), 604-620.

Mei, Jin, "Laser Warning Receiver", National Air Intelligence Center (English Translation), (Aug. 20, 1996), 24 pgs.

"U.S. Appl. No. 17/411,859, Non Final Office Action mailed Dec. 20, 2022", 17 pgs.

"U.S. Appl. No. 17/411,859, Response filed Feb. 28, 2023 to Non Final Office Action mailed Dec. 20, 2022", 11 pgs.

"International Application Serial No. PCT/US2022/041372, International Search Report mailed Dec. 8, 2022", 5 pgs.

"International Application Serial No. PCT/US2022/041372, Written Opinion mailed Dec. 8, 2022", 9 pgs.

"Part 1 Indentification and Significance of the Problem", [Online]. Retrieved from the Internet: <URL: https://web.archive.org/web/20081104075342/http://www.eagleshore.com/rsc/lwr.htm>, (Nov. 4, 2008), 19 pgs.

\* cited by examiner

THREE FEET

FRONT VIEW

BACK VIEW

SIDE VIEW

ONE FOOT

FRONT VIEW

BACK VIEW

SIDE VIEW

QUICK-MOUNT LASER WARNING RECEIVER

BACKGROUND

Field

This disclosure relates to laser warning receivers (LWRs) and more specifically to a LWR package that can be quickly and reliably mounted to the flat or curved inner surface of an optically transparent window of a manned platform and oriented to detect laser threats and to display laser warnings to the occupant.

DESCRIPTION OF THE RELATED ART

"In the last 20 years, the applications of lasers in military affairs have grown wider by the day. Laser range finding causes the first round hit probability for guns to very, very greatly increase. Laser guidance then increases in an extremely large way weapon launch precisions and hit probabilities. Cost benefit ratios are very high. The combat power of U.S. military forces has already improved an order of magnitude relying on these small energy laser systems.

How should fire control systems having laser range finding and laser guided weapons systems be handled? This simply requires timely discovery of the laser operations of the hostile side. Laser warning receivers are the basic materiel for implementing laser countermeasures. Their role is to detect in a timely and accurate manner enemy laser range finders, laser radiation emitted from such things as target indicators, laser beam guidance illumination devices, and so on, to send out warnings, and to make notification of certain types of weapons of a threatening nature for example, artillery shells, bombs, or missiles having a possibility of coming in immediately, in order to facilitate the adoption in a timely manner of friendly emergency measures, or evasion, or the laying of smoke screen aerosols to protect themselves, or to notify associated weapons systems for example, guns or laser blinding weapons, and so forth to implement countermeasures. As a result, laser warning receivers are very significant with regard to effectively protecting oneself and destroying the enemy on the battlefield." National Air Intelligence Center Wright-Patterson AFB OH "Laser Warning Receiver" Aug. 20, 1996.

The AN/AAR-47 missile warning system is a missile approach warning system used on slow moving aircraft such as helicopters and military transport aircraft to notify the pilot of threats. The system passively detects missiles by their ultraviolet signature. Newer versions include laser warning receivers that are capable of detecting a wide range of laser threats from laser guidance systems and laser rangefinders. Detectors used in LWRs are usually based on a semiconductor photodetector array, which is typically cryogenically or thermal-electric cooled. Sometimes avalanche photodiodes (APD), photoconductivity, photoelectromagnetic, or photodiffusion devices are used even without cooling. The system includes 4 optical sensor converters (OSC), a computer processor and a control indicator. There is one OSC for each side of the aircraft. They have an infrared camera for detecting incoming missiles and a LWR. The computer processor evaluates the data from the 4 OSCs to determine whether the aircraft is being illuminated with a laser or to detect an incoming missile. If a threat is detected, the computer processor sends a signal to the control indicator to give the pilot an audio and visual warning and indicate the direction of the incoming threat.

An emerging threat to both commercial and military aircraft is the individual on the ground with a laser pointer that feels compelled to direct the laser beam through the cockpit window. The laser is typically a continuous wave (CW) laser in the visible (e.g., green) or NIR/SWIR bands. The laser can distract the pilots and possible cause permanent eye damage. Aircraft are particularly susceptible to this threat during takeoff and landing. Currently, there are no affordable LWRs that can be retrofit to commercial or military aircraft to effectively detect this specific threat.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a laser warning receiver that can be detachably mounted on the inside of a window of a manned platform to detect laser threats within its field-of-view (FOV) and to provide visual or audio warnings to the human occupant. The LWR is fully self-contained and independent of any systems on the manned platform. In different packaging configurations, the receiver's FOV can be manually rotated to better visualize the threat and/or the receiver's human-machine interface (HMIF) can be manually rotated to better display the warnings. The FOV is suitably between +/−30 and +/−90 degrees full field. Although most typically used in manned aircraft the LWR can be used in other manned vehicles or ships.

In an embodiment, a self-contained quick-mount laser warning receiver includes a LWR having a forward-facing aperture with a FOV, an optical detector and a rearward-facing human-machine interface (HMIF) and a quick release mechanism for mounting the LWR to a flat or curved inner surface of an optically transparent window of a manned platform to position the forward-facing aperture to receive light within the FOV through the optically transparent window and to provide visual or audio warnings of a detected laser source to the human occupant.

In an embodiment, the LWR is configured to detect only CW threats in the visible or NIR/SWIR beams. In another embodiment, the LWR is configured to detect these CW threats as well as pulsed beams such as typical of rangefinders or guidance systems.

In different embodiments, the quick release mechanism may include 1, 2 or 3 feet. For 2 or 3 feet, each foot is rotatably coupled to the LWR such as via a ball joint in order to accommodate mounting on a curved surface. Each foot may be, for example, a lockable suction cup, Velcro, a magnet or other attachable/detachable mechanism.

In different embodiments, the HMIF may provide visual or audio warnings as to the status of the LWR (e.g., battery level) or the presence, characterization (e.g., CW or pulsed, band or strength) or position (e.g., angle of attack, quadrant, etc.) of the detected laser source.

In different embodiments, the LWR may be configured to provide for manual rotation to point the FOV (decoupled from the surface normal to the window) and/or manual rotation to better orient the HMIF relative to the occupant. The manual rotation of the FOV and the HMIF may be rigidly coupled or independent of each other. The rotation may occur in a single axis such as cylindrical rotation about the viewing axis (e.g., the z-axis normal to the window) or in multiple axis to point the FOV or HMIF up/down (e.g., about the x-axis) or left/right (e.g., about the y-axis). Cylindrical rotation may be provided by forming complementary patterns of locking features (e.g., teeth) on the LWR and on a stationary device platform mounted via the 1, 2 or 3 feet. Full 3-axis rotation may be provided by a ball joint, solely mechanically or both mechanical and optical, or by the combination of a single foot, a cantilevered arm and cylindrical rotation.

In an embodiment, the quick release mechanism includes one or more feet coupled to a stationary device platform formed with locking features and complementary locking features formed on the LWR. The LWR may be manually lifted, rotated as desired and replaced to cylindrically rotate the LWR.

In an embodiment, the quick release mechanism includes a single lockable suction cup including a rotatable mount. A cantilever arm attaches the LWR to the rotatable mount. Rotation of the cantilever arm enables axis alignment. Full 3-axis rotation can be achieved by providing the LWR with a cylindrical rotation mechanism and rotating the single lockable suction cup.

In an embodiment, the quick release mechanism includes two or more feet (e.g., suction cups) rotatably coupled (e.g., ball joints) to a stationary device platform having a ball joint interface and an optical ball joint positioned in the interface that rigidly and optically couples the aperture to the optical detector. The LWR can be manually rotated to rotate the FOV or to point the FOV up/down or left/right.

In an embodiment, the quick release mechanism includes a single lockable suction cup including a mechanical ball joint. The mechanical ball joint engages a ball joint interface formed underside of the LWR. The forward-facing aperture is positioned outside of the footprint of the single suction cup. Its FOV can be rotated cylindrically about the surface normal to the window or to point the FOV up/down or left/right relative to the surface normal.

In an embodiment, the quick release mechanism includes a single lockable suction cup including a ball joint interface. An optical ball joint engages the ball joint interface to rigidly and optically couple the aperture to the optical detector and position the forward-facing aperture within the footprint of the single suction cup. Its FOV can be rotated cylindrically about the surface normal to the window or to point the FOV up/down or left/right relative to the surface normal. The optical ball joint and interface must be sealed to maintain proper suction.

In an embodiment, the quick release mechanism maintains a fixed FOV with respect to the surface normal to the optically transparent window. The HMIF is rotatably coupled via, for example, a ball joint or cantilever arm to allow for proper orientation of the HMIF.

In an embodiment, the quick release mechanism includes first and second rotational couplers that allow for independent rotation in 1, 2 or 3 axes to point the FOV and to orient the HMIF.

These and other features and advantages of the disclosure will be apparent to those skilled in the art from the following detailed description of preferred embodiments, taken together with the accompanying drawings, in which:

DETAILED DESCRIPTION

The present disclosure provides a laser warning receiver that can be detachably mounted on the inside of a window of a manned platform to detect laser threats within its field-of-view (FOV) and to provide visual or audio warnings to the human occupant. The LWR is fully self-contained and independent of any systems on the manned platform. In different packaging configurations, the receiver's FOV can be manually rotated to better visualize the threat and/or the receiver's human-machine interface (HMIF) can be manually rotated to better display the warnings. Although most typically used in manned aircraft the LWR can be used in other manned vehicles.

Figure 1:
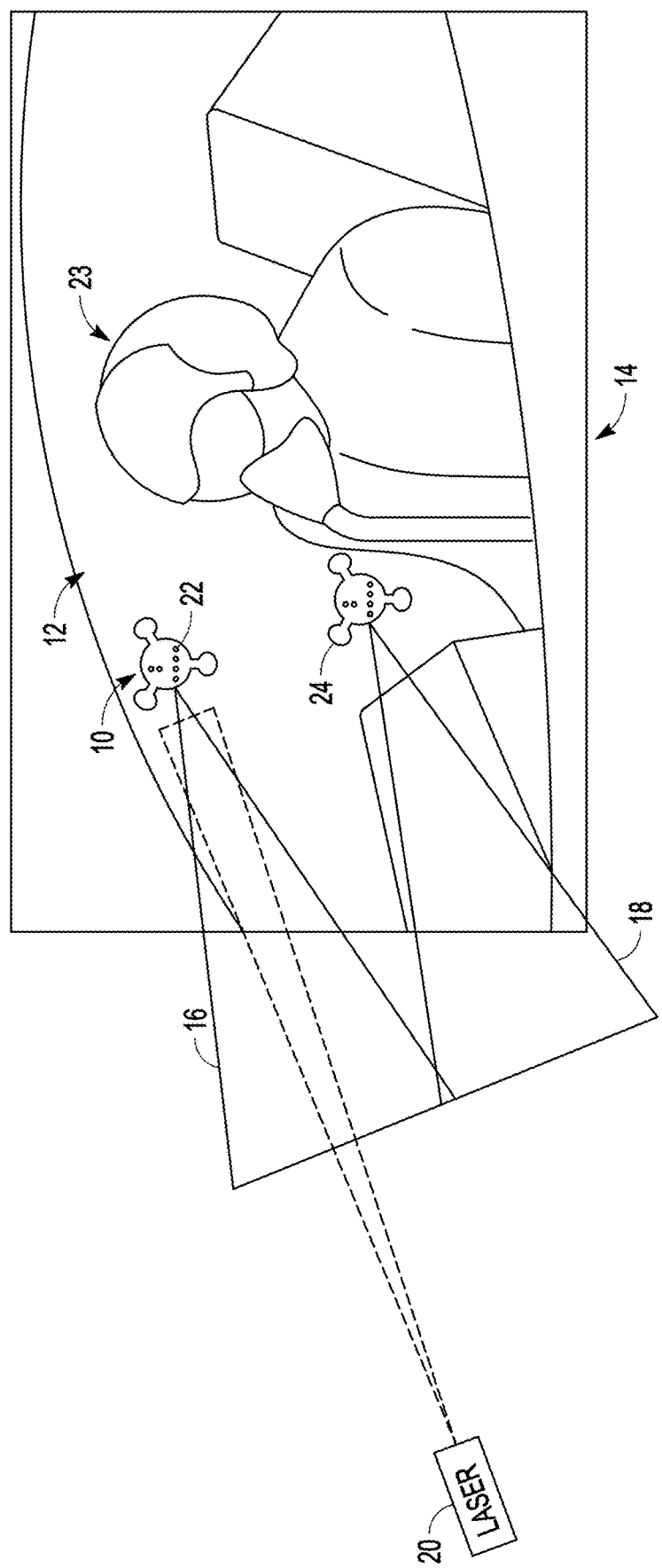
FIG. 1 is an illustration of a quick-release laser warning receiver mounted inside the cockpit of a manned aircraft.

Referring now to FIG. 1, in a representative application a pair of LWRs 10 are mounted on an inner surface of a cockpit window 12 of a manned aircraft 14 to provide FOV 16 and 18, typically but not necessarily overlapping, to detect threats from a laser source 20 and to provide visual or audio warnings 22 to a human occupant (e.g., the pilot) 23. Each FOV, for example, may be between +/−30 to +/−90 degrees in two directions to provide between 60 and 180 degrees of coverage full-field per sensor. The LWR is fully self-contained (e.g., own power source, electronics, human-machine interface) and independent of any systems on the manned platform. The LWR includes a quick release mechanism 24 (adapted for mounting on either a flat or curved surface) that allows the pilot to position each LWR 10 as best suited to detect the threat based at least in part on the nature of the threat, the slope of window 12, other instrumentation in the cockpit and pilot preference. The nature of the threat may, for example, be limited to only a person on the ground with a laser pointer (e.g., a continuous wave (CW) source in the visible or NIR/SWIR bands). This threat is most pervasive during takeoff or landing. Alternately, the threat may be a rangefinder or guidance beam for a weapons system, typically pulsed. The pointing of the LWR FOV 18 can be adjusted in-flight, if desired, based on changing threat locations. This threat is present throughout all phases of flight. LWR 10 may be configured to detect and warn based on either threat and to provide warnings that characterize or identify the threat and to possible locate the threat. Detection and possible characterization or location of the laser source may allow the pilot to don aircrew laser eye protection (ALEP), to radio the source characterization or location information to address the threat or to take evasive action or deploy countermeasures.

This attachable/detachable self-contained LWR 10 provides much needed laser threat detection capability for both commercial and military aircraft. The Size, Weight and Power-Cost (SWAP-C) of the LWR 10 is highly favorable when compared to the implementation or retro-fit of OSCs mounted around the aircraft that feed hard data to a central computer that presents warnings via a hard-wired system in the cockpit. The LWR 10 is simple and easy to use.

Figure 2:
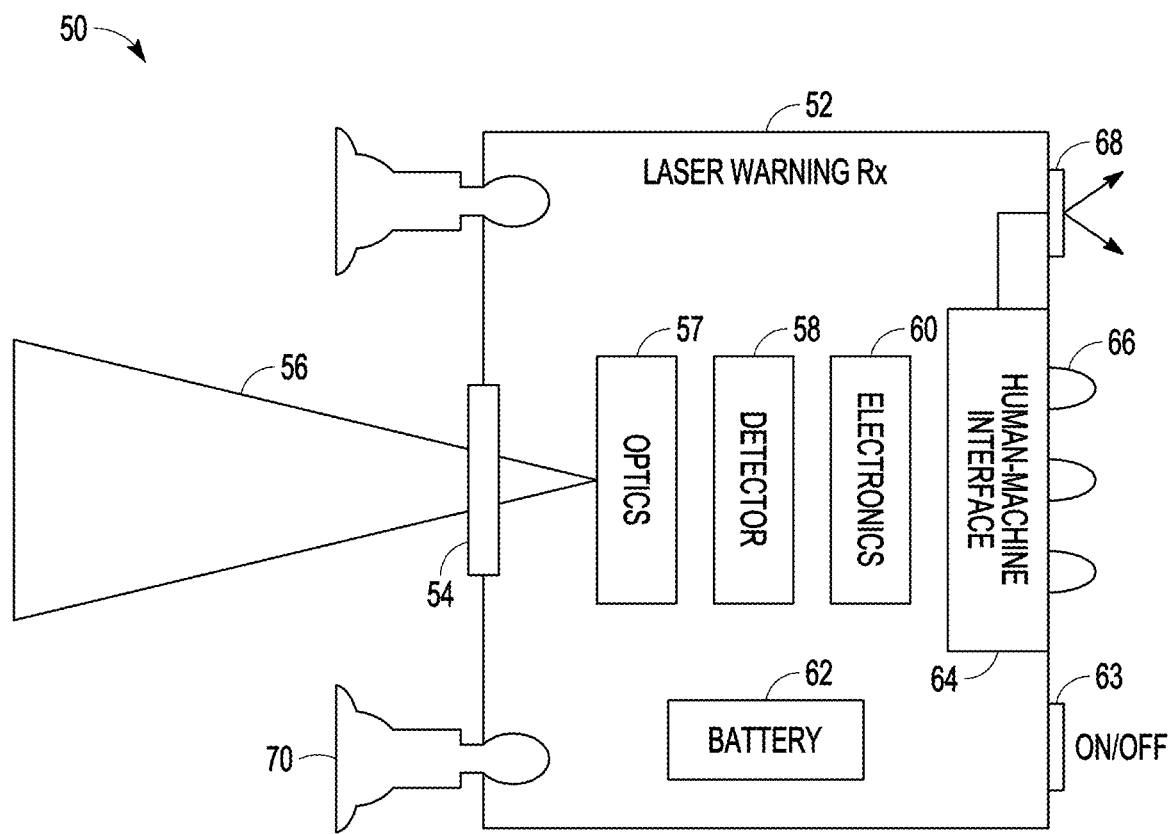
FIG. 2 is a block diagram of an embodiment of a laser warning receiver.
Figure 3A:
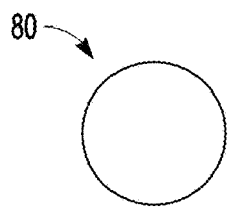
FIGS. 3A-3D are diagrams of single pixel, quadrant, linear array and 2D array for the optical detector.
Figure 3B:
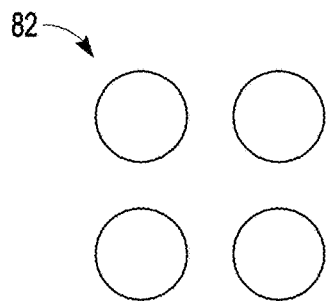
Figure 3C:
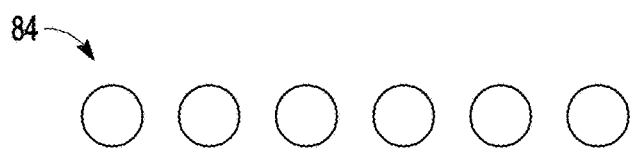
Figure 3D:
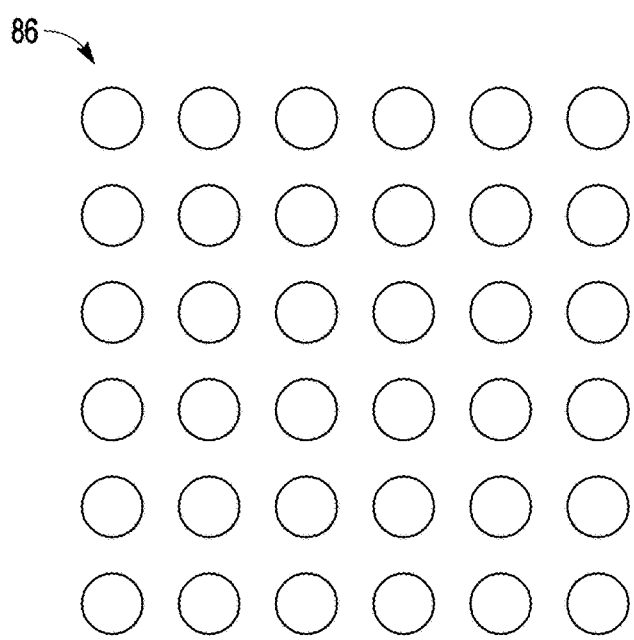

Referring now to FIG. 2, in an embodiment a self-contained quick-mount LWR 50 includes a LWR 52 having forward-facing aperture 54 with a FOV 56, optics 57, an optical detector 58, electronics 60, a battery 62, an on/off button 63 and a rearward-facing human-machine interface (HMIF) 64 configured to provide visual warnings via LEDs 66 or audio warnings via a speaker 68. These warnings may include device status (battery level), threat detected, threat characterization or threat location. The optics/detector/electronics may, for example, be of the type described in U.S. Pat. No. 7,456,940 B2 entitled "Methods and Apparatus for Locating and Classifying Optical Radiation" or co-pending U.S. patent application Ser. No. 17/411,859 entitled "Warning Receiver for Detecting and Characterizing an Optical Source" filed Aug. 25, 2021 as well as many other configurations of the LWR itself depending on whether it is configured to detect only CW, only pulsed or both, and for various bands and whether the LWR is configured to provide only a warning or to provide additional information such as threat characterization or location. A quick release mechanism 70 is coupled to LWR 52 for mounting the LWR 52 to a flat or curved inner surface of an optically transparent window of a manned platform to position the forward-facing aperture to receive light within the FOV 56 through the optically transparent window and to provide visual or audio warnings of a detected laser source to the human occupant.

Referring now to FIGS. 3A-3D, the optical detector may include a single pixel 80, four pixels 82 to form a quadrant detector, a linear array 84 of pixels or a two-dimensional array 86 of pixels. The single pixel, quadrant and two-dimensional array all exhibit symmetrical or rotationally invariant FOV. The linear array will produce a "fan beam" type FOV. The single pixel 80 can detect a threat in its FOV. The quadrant detector may be configured to locate the source within a particular quadrant and the two-dimensional array may be configured to provide a specific angle to the source.

Figure 4A:
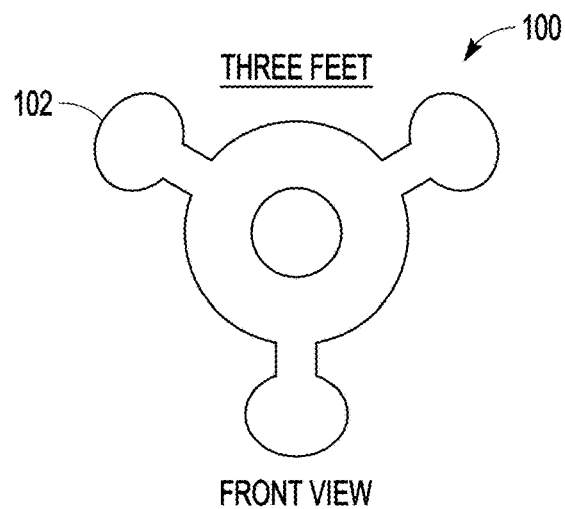
FIGS. 4A-4C, 5A-5C and 6A-6C are front, back and side views of a LWR in which the quick release mechanism includes 3, 2 or 1 suction cup feet.
Figure 4B:
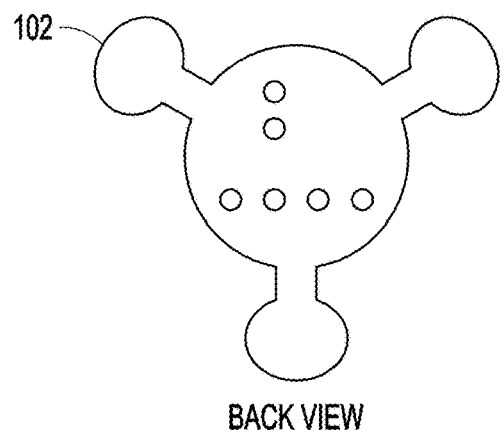
Figure 4C:
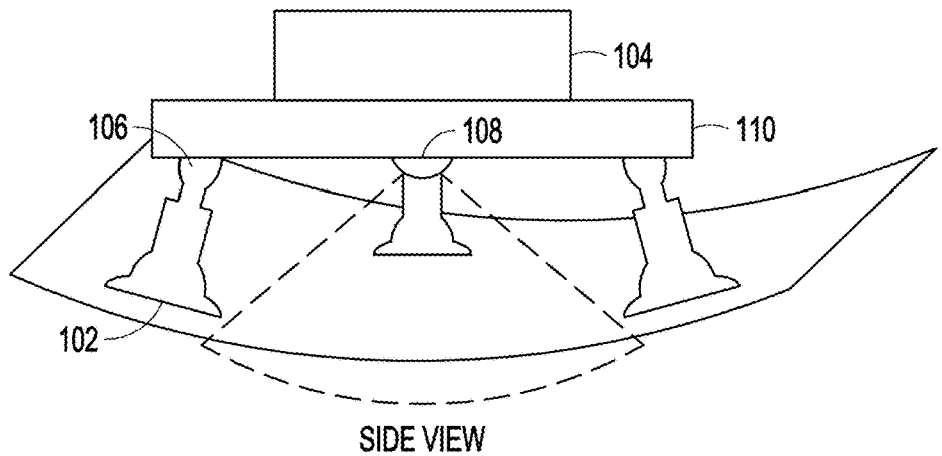
Figure 5A:
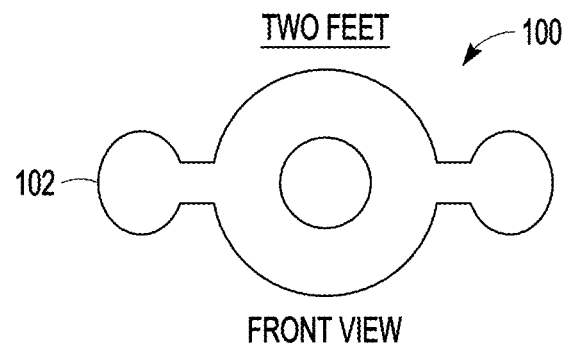
Figure 5B:
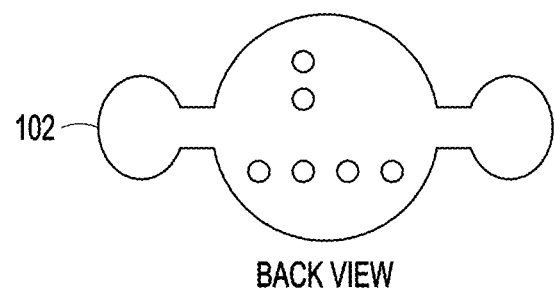
Figure 5C:
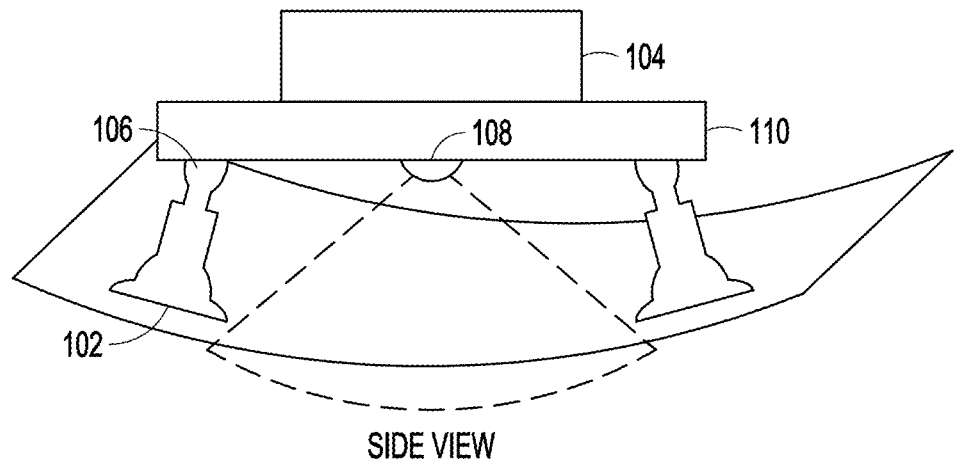
Figure 6A:
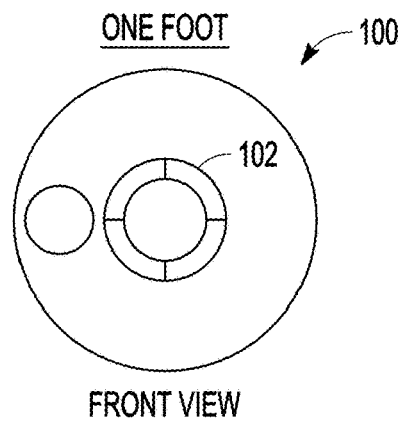
Figure 6B:
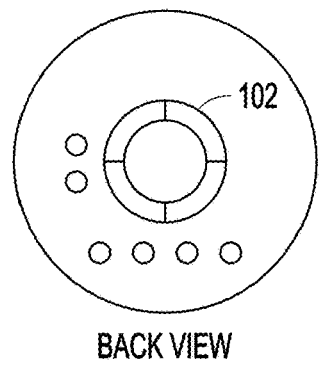
Figure 6C:
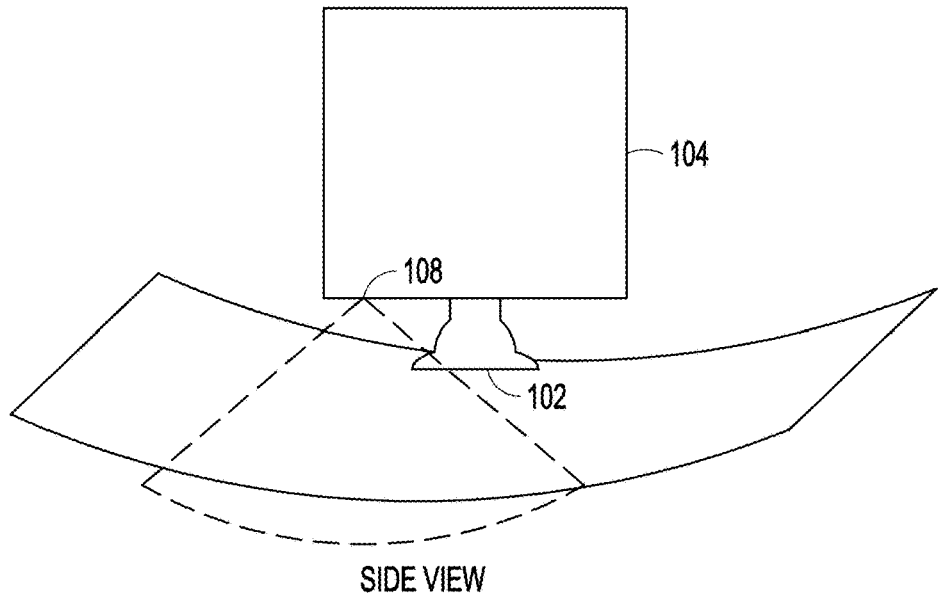
Figure 7:
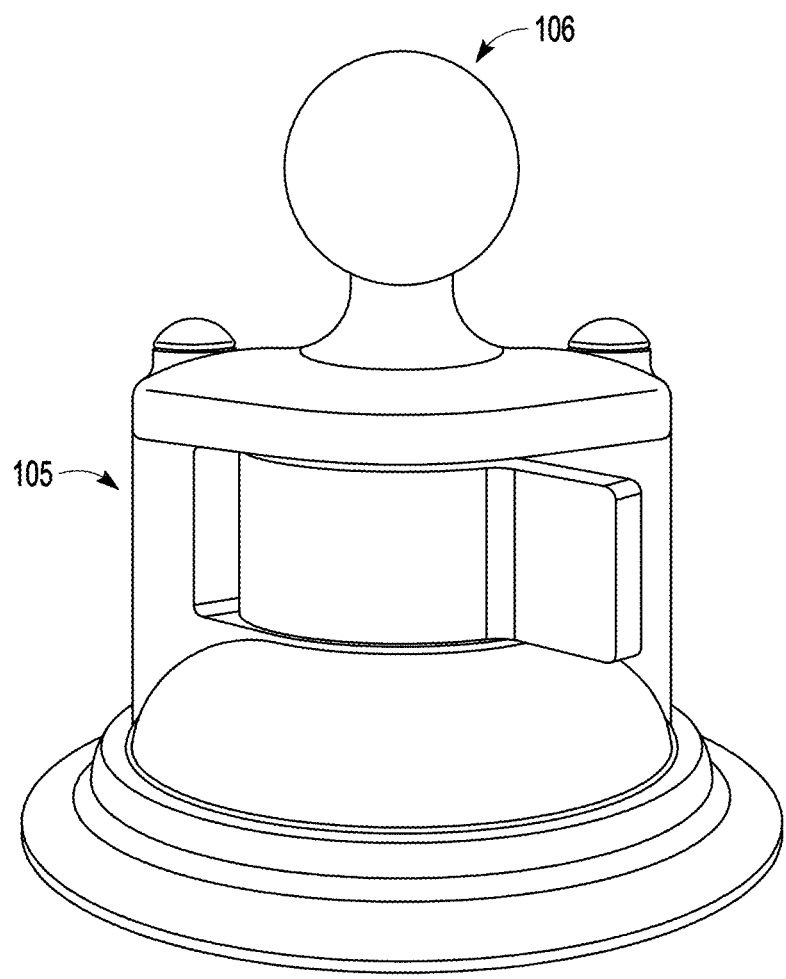
FIG. 7 is an illustration of a lockable suction cup foot with a centrally located mechanical ball joint.

Referring now to FIGS. 4A-4C, 5A-5C and 6A-6C, different embodiments of a quick release mechanism 100 may include 3, 2 or 1 feet 102 coupled to a LWR 104. The "feet" may be, for example, lockable suction cups 105 such as RAM® Mounts Twist-Lock™ shown in FIG. 7, Velcro, or magnets. In the cases of 2 or 3 feet, each foot 102 is rotationally coupled to the LWR 104 by, for example, a ball joint 106 to provide rotation about 3 axes to facilitate mounting on a curved surface. The ball joint is not necessary for flat surfaces. The LWR's forward-facing aperture 108 is suitably positioned at the center of the 2 or 3 feet but may be located elsewhere based on internal packaging constraints. For a single foot 102, the forward-facing aperture 108 may be offset and positioned outside the footprint of the single foot as shown in FIG. 4C. Alternately, the forward-facing aperture 108 may in certain circumstances be centrally located within that footprint. As depicted, the feet 102 are coupled to a stationary device platform 110 on which the LWR 104 is mounted with a clear aperture through the platform. The ball joints 106 may be discrete or integrally formed with platform 110. The number and configuration of feet 102 may be determined by requirements to balance the LWR 104 or to limit vibration and the size and weight of the LWR.

Figure 8:
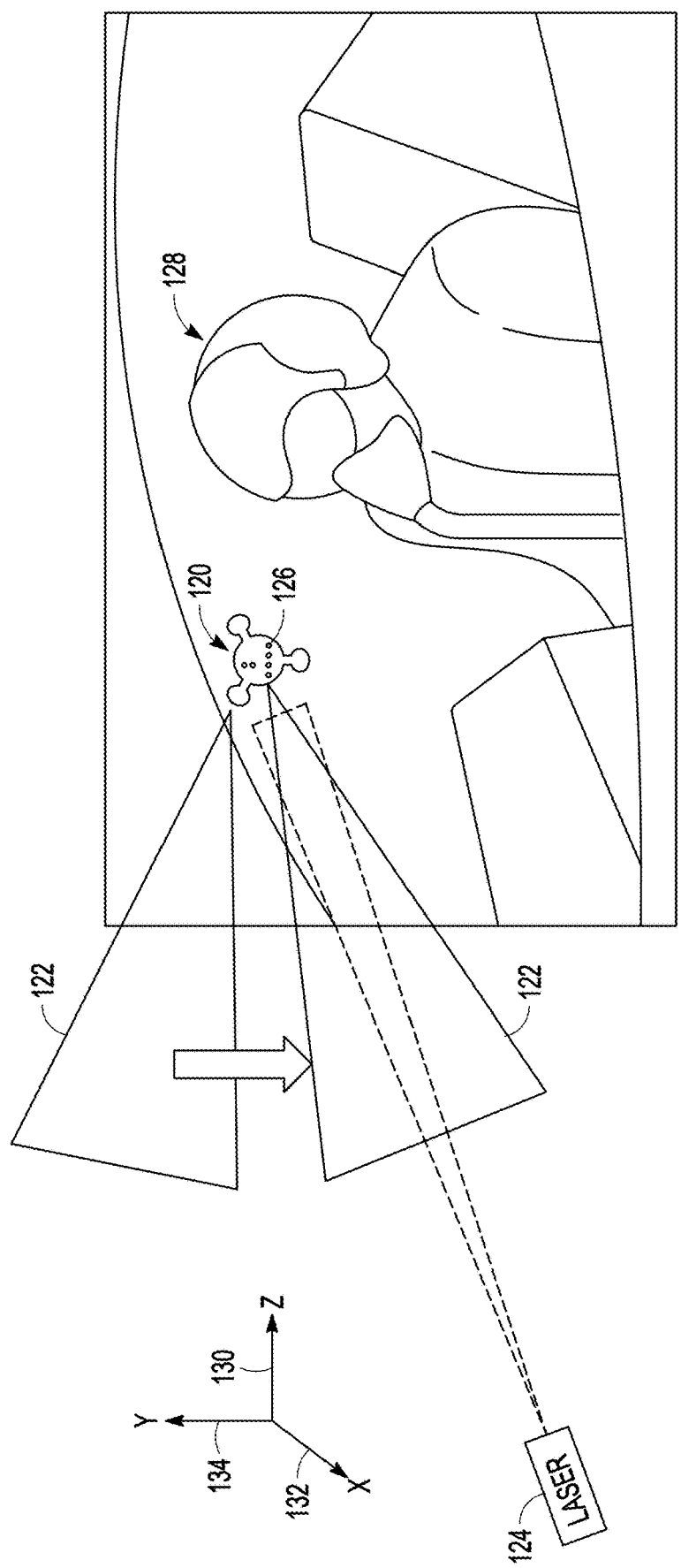
FIG. 8 is an illustration of a quick-release laser warning receiver mounted inside the cockpit of a manned aircraft in which the LWR can rotate to point the FOV or to present the HMIF to the pilot.

Referring now to FIG. 8, a self-contained quick-mount LWR 120 that provides the capability to rotate (point) the LWR's FOV 122 to better visual the threat (laser source 124) or to rotate (orient) the LWR's HMIF 126 towards the pilot 128 is desired such that a single design can be used on multiple different platforms with multiple different window shapes and slopes to address multiple different threats, ground vs air-based, takeoff and landing only vs all phases of flight, etc. The rotation capability may be limited to cylindrical rotation about the X-axis 130 (surface normal to the window) or may provide rotate about the Z-axis 132 to tip the FOV up/down or may provide rotation about the Y-axis 134 to tip the FOV 122 left/right or preferably provide rotation about all 3 axes. The HMIF 126 may be rigidly coupled to the forward-facing aperture and FOV 122 such that they rotate in the same manner. Alternately, the FOV could be fixed and the HMIF allowed to rotate or multiple coupling mechanisms could be provided to allow for independent pointing of the FOV 122 and orientation of HMIF 126. In general, the rotational coupling can provide 360 degrees of cylindrical rotation and approximately 20-30 degrees of rotation about the X and Y axis as constrained by limitations of the mount e.g., spacing of the aperture to the window, spacing between the aperture and the mount, etc. The capability designed into LWR 120 will depend on the platform (e.g., slope of the window), nature of the threat and SWAP-C.

Figure 9B:
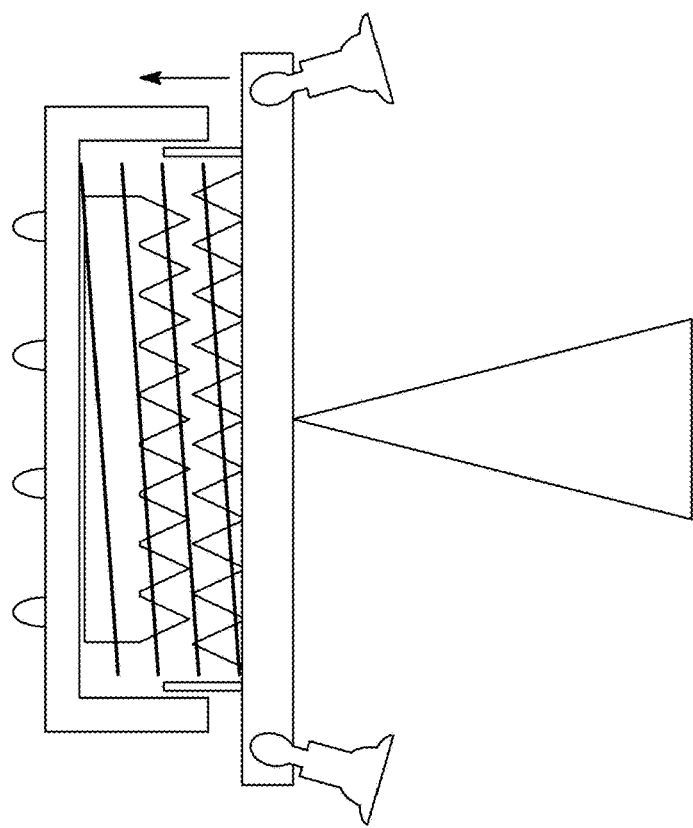
FIGS. 9A and 9B illustrate an embodiment of a LWR that is configured to provide cylindrical rotation.
Figure 9A:
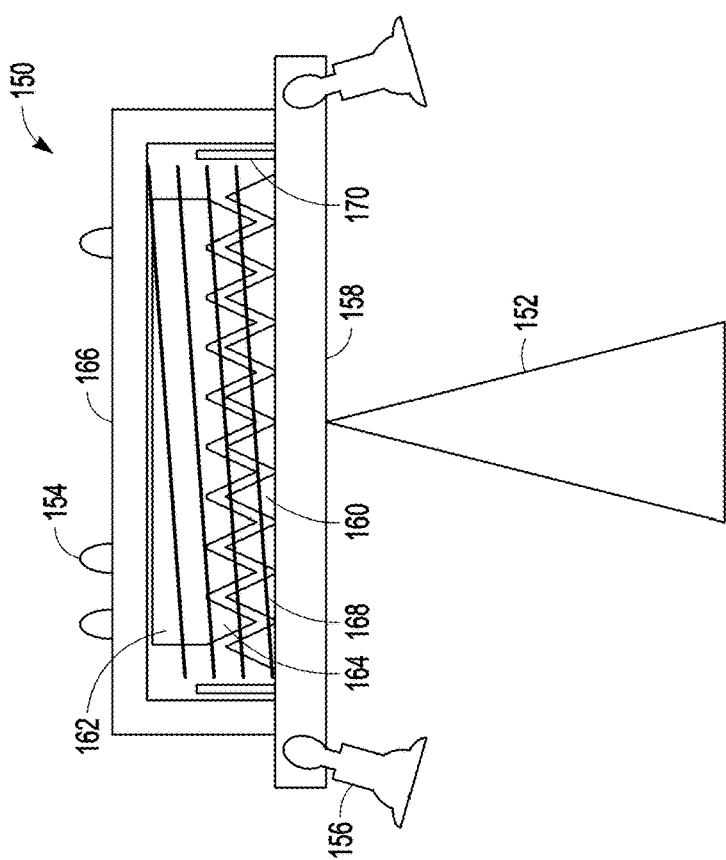

Referring now to FIGS. 9A-9B, a self-contained quick-mount LWR 150 is configured to provide cylindrical rotation of the sensor body 162 and mounted HMIF 154. Most typically, this capability would be used by the pilot to orient the HMIF 154 in a preferred direction so that it is more readily visible to the pilot. However, if the optical detector provides a fan beam FOV or a single foot with an offset aperture is used, cylindrical rotation can be used to properly point the FOV. In this embodiment, a pair of feet 156 are coupled to a stationary device platform 158 formed with locking features (e.g., teeth) 160. A rotational sensor body 162 of the LWR is formed with complementary locking features (e.g., teeth) 164 and provided with a housing cap 166. A tension spring 168 couples sensor body 162 to stationary device platform 158 and a retention guide 170 to ensure the sensor body 162 does not shift laterally during extension, thereby keeping the locking teeth 164 and 160 aligned. The pilot can attach the LWR 150 with an arbitrary orientation, lift housing cap 166 to disengage the complementary locking features, rotate the HMIF 154 about the surface normal (Z-axis) to the desired orientation (90 degrees as shown), and replace the housing cap 166 to engage the complementary locking features.

Figure 10:
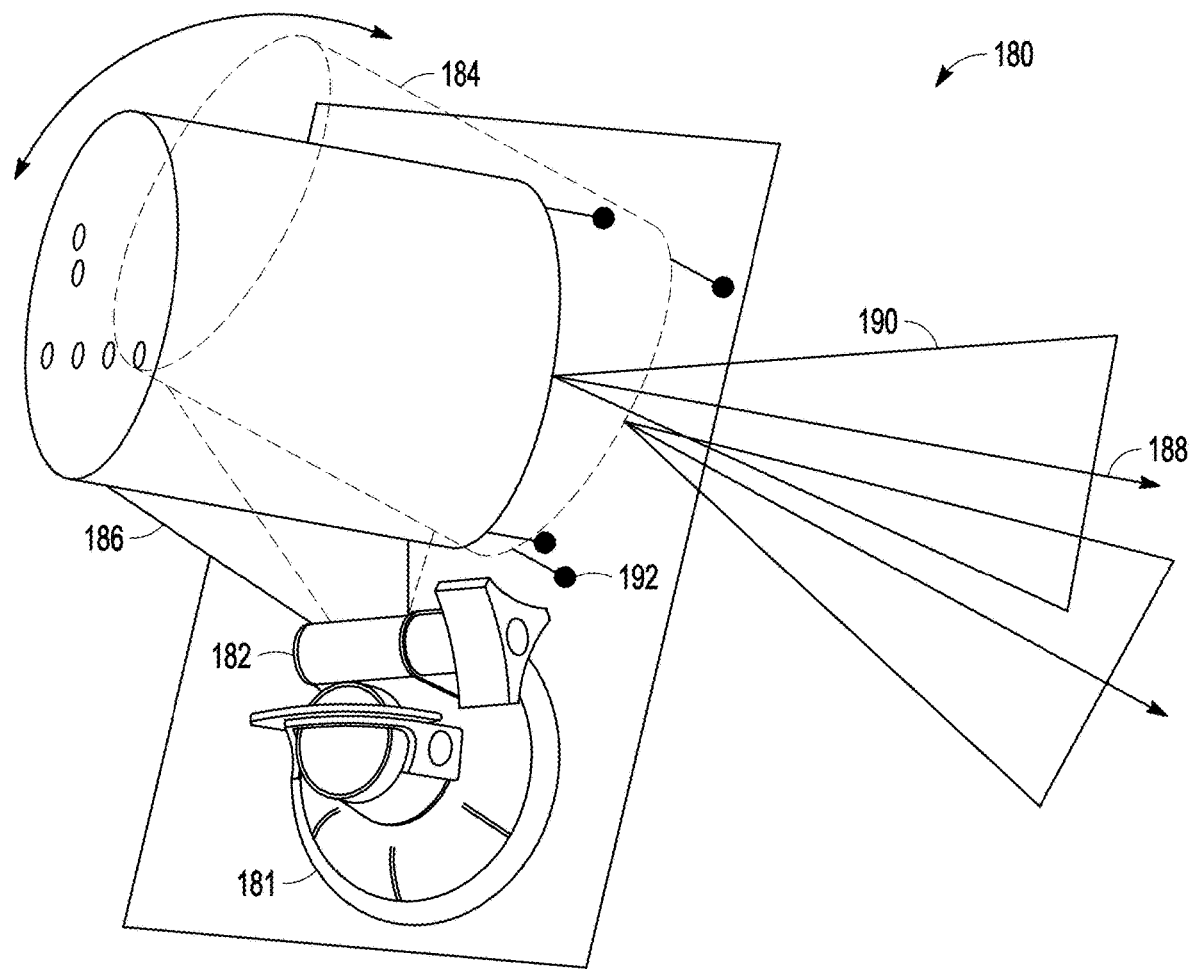
FIG. 10 illustrates an embodiment of a LWR and quick-mount release including a cantilevered arm.

Referring now to FIG. 10, a self-contained quick-mount LWR 180 includes a single lockable suction cup 181 that includes a lockable rotatable mount 182. A LWR device 184 is attached via a cantilever arm 186 to rotatable mount 182. Cantilever arm 186 can be rotated to point an axis 188 of the FOV 190. Adjustable feet 192 may be provided to stabilize the LWR 180. The feet may contain smaller suction cups, adhesive, or other features to help minimize jitter. A second axis of rotation can be provided by incorporating the cylindrical rotation design depicted in FIGS. 9A-9B. A third axis of rotation can be provided by rotating the suction cup 181.

Figure 11:
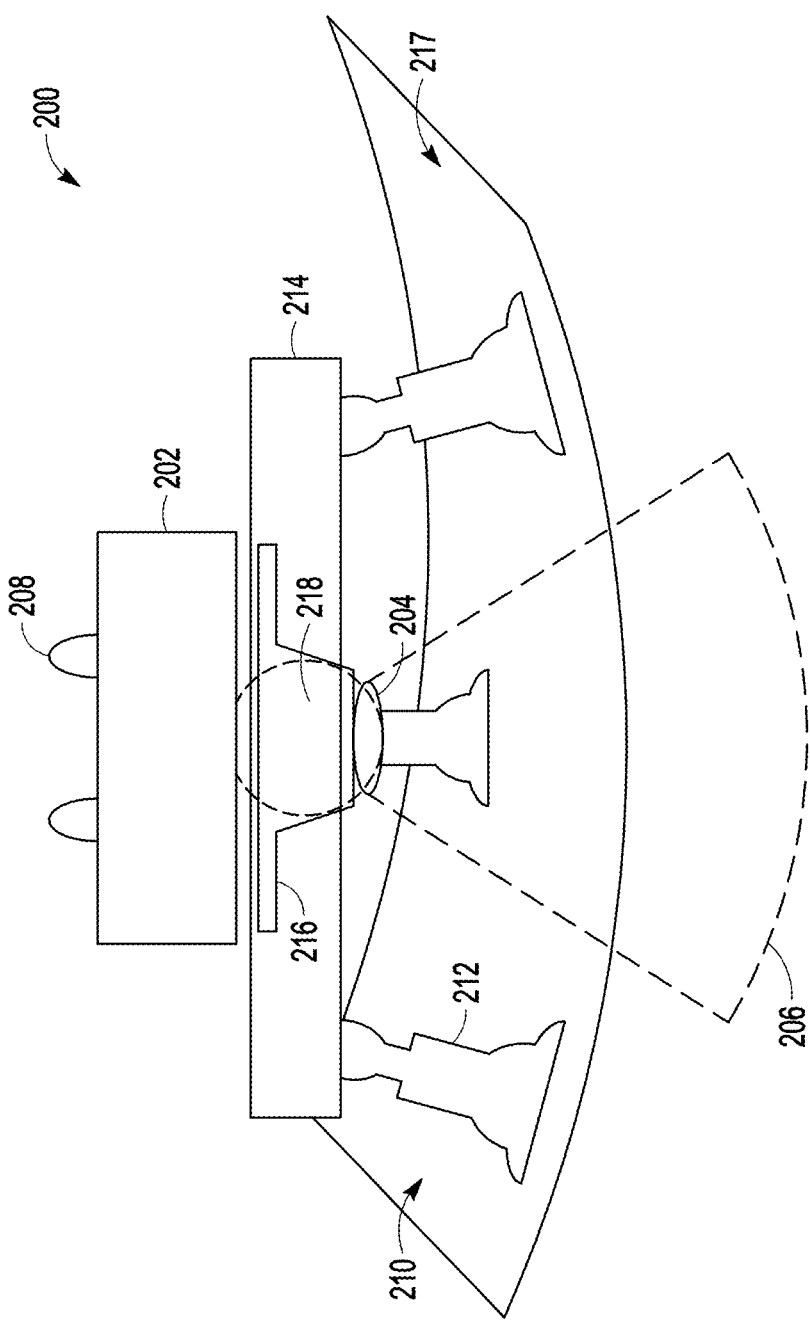
FIG. 11 illustrates an embodiment in which the quick-mount release mechanism includes a device platform having three rotatably-coupled suction cup feet and a centrally located optical ball joint to point the FOV.

Referring now to FIG. 11, a self-contained quick-mount LWR 200 includes a LWR 202 having a forward-facing aperture 204 with a FOV 206 and a rearward-facing HMIF 208. A quick release mechanism 210 includes at least two feet 212 rotatably coupled to a stationary device platform 214 including a ball joint interface 216 (suitably positioned in the center of the feet) for mounting to a flat or curved inner surface 217 of an optically transparent window. An optical ball joint 218 is positioned in the ball joint interface 216 to rigidly and optically couple the forward-facing aperture 204 to the LWR 202. The optical ball joint is configured to manually rotate the LWR 202 to point the FOV.

Figure 12:
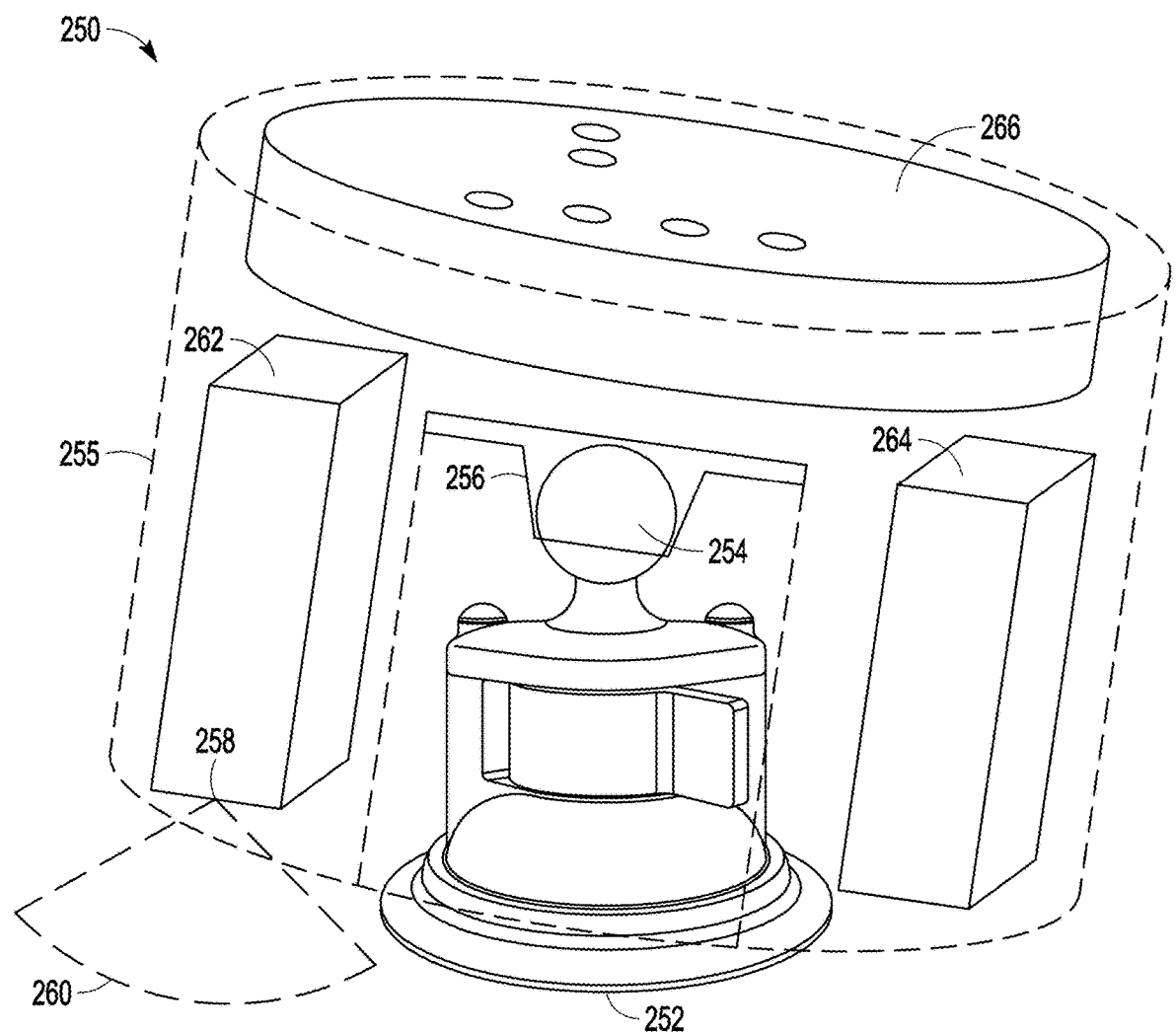
FIG. 12 illustrates an embodiment in which the quick-mount release mechanism includes a single suction cup foot having a mechanical ball joint on which the LWR is rotatably coupled.

Referring now to FIG. 12, a self-contained quick-mount LWR 250 includes a single lockable suction cup 252 having a centrally located mechanical ball joint 254. A device package 255 includes a ball joint interface 256 that engages mechanical ball joint 254. The LWR's forward-facing aperture 258 is offset and positioned outside the footprint of the single lockable suction cup 252. The LWR's FOV 260 can be rotated about the axis through the suction cup (the Z-axis) or about the X and Y axes. Within device package 255, the optical detector 262 is suitably offset with the aperture 258 and the battery 264 is offset in the other direction to provide balance. The electronics and HMIF 266 are mounted on the rear facing side of the ball joint interface 256. The exact locations of the battery 264, electronics within the HMIF 266, and optical detector 262 can be moved to balance the system and fit necessary components within the device package 255.

Figure 13:
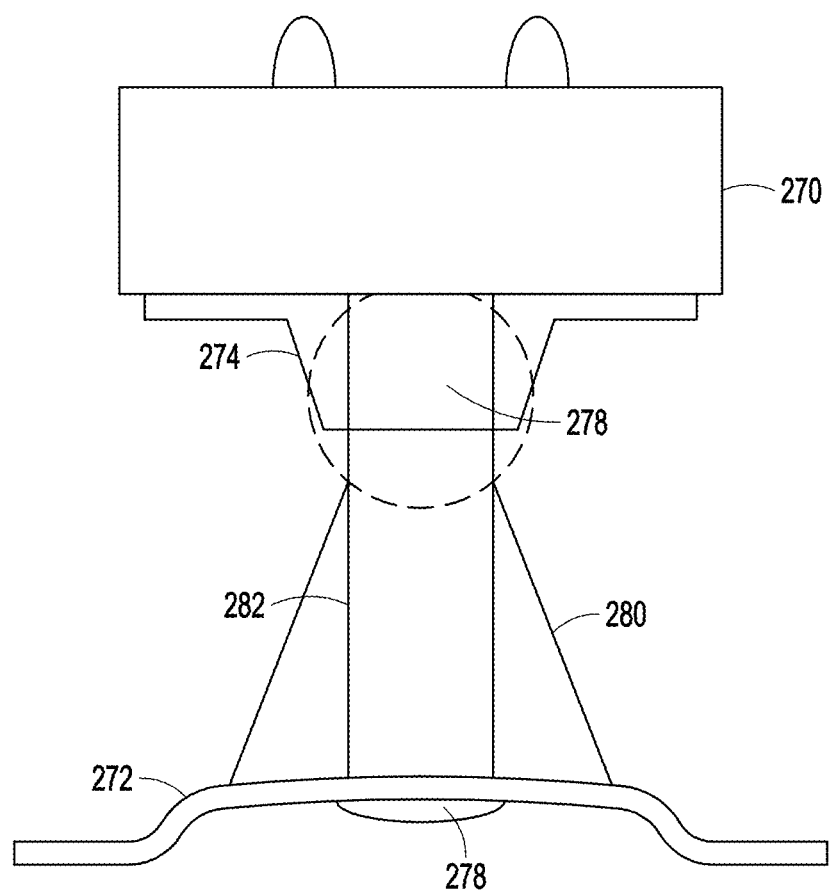
FIG. 13 illustrates an embodiment in which the quick-mount release mechanism includes a single suction cup foot having an optical ball joint on which the LWR is rotatably coupled.

Referring now to FIG. 13, a self-contained quick-mount LWR 270 includes a single lockable suction cup 272 having a centrally located ball joint interface 274. An optical ball joint 276 rigidly and optically couples a forward-facing aperture 278 to a LWR 270. Optical ball joint 276 engages ball joint interface 274 to provide the requisite 3-axis rotation. A seal 280 is formed between interface 274 and ball joint 276 in order to maintain suction. The aperture 278 is installed in the suction cup 272 with a suitably compliant adhesive to maintain suction without shifting the location of the aperture 278 relative to the optical ball joint 276. The aperture 278 is also rigidly mounted to a tube 282 within the suction structure of the LWR 270 such that the lens does not move relative to the optical ball joint 276 to enable accurate angle resolution between the FOV and LWR detector.

Figure 14:
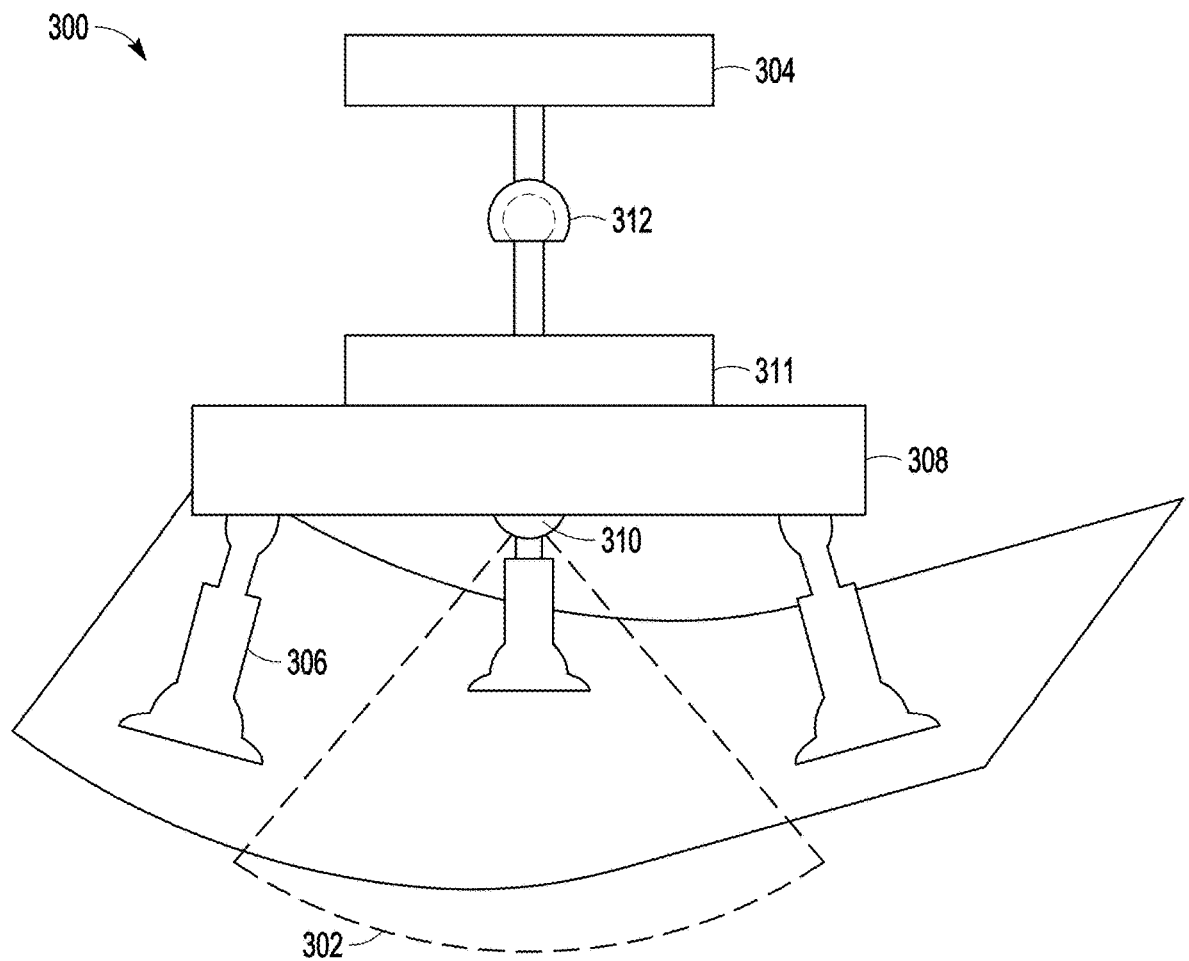
FIG. 14 illustrates an embodiment in which the HMIF is rotatably coupled to the LWR whose FOV is fixed.

Referring now to FIG. 14, a self-contained quick-mount LWR 300 is configured to provide a fixed FOV 302 and allow for rotation of a HMIF 304. One or more feet 306 are coupled to a stationary device platform 308. At least the optics that provide a forward-facing aperture 310 and the optical detector 311 are rigidly mounted on stationary device platform 308. A rotational mechanism 312 such as a cantilever arm or ball-joint arm connect (mechanically and electrically) the stationary device platform 308 to HMIF 304 allowing the FOV to remain fixed while providing for manual orientation of the HMIF.

Figure 15:
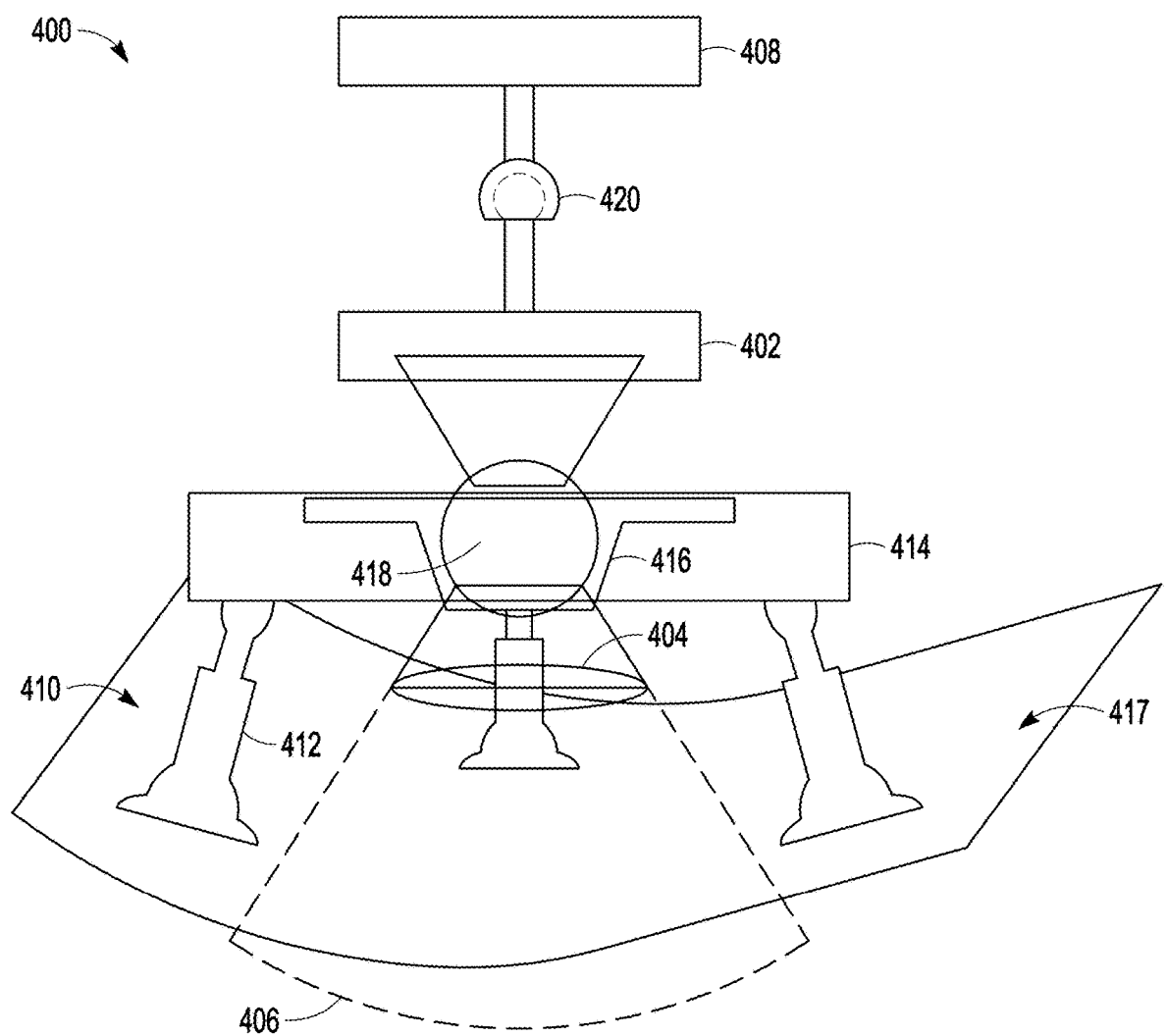
FIG. 15 illustrates an embodiment in which the LWR's FOV and HMIF are independently rotatably coupled to independently point the FOV and orient the HMIF.

Referring now to FIG. 15, a self-contained quick-mount LWR 400 includes a LWR 402 having a forward-facing aperture 404 with a FOV 406 and a rearward-facing HMIF 408. A quick release mechanism 410 includes at least two feet 412 rotatably coupled to a stationary device platform 414 including a ball joint interface 416 (suitably positioned in the center of the feet) for mounting to a flat or curved inner surface 417 of an optically transparent window. An optical ball joint 418 is positioned in the ball joint interface 416 to rigidly and optically couple the forward-facing aperture 404 to the LWR 402. The optical ball joint is configured to manually rotate and point the FOV. A rotational mechanism 420 such as a cantilever arm or ball-joint arm connect (mechanically and electrically) the stationary device platform 414 to HMIF 408 allowing HMIF to be oriented independent of the pointing of FOV 406.

Figure 16:
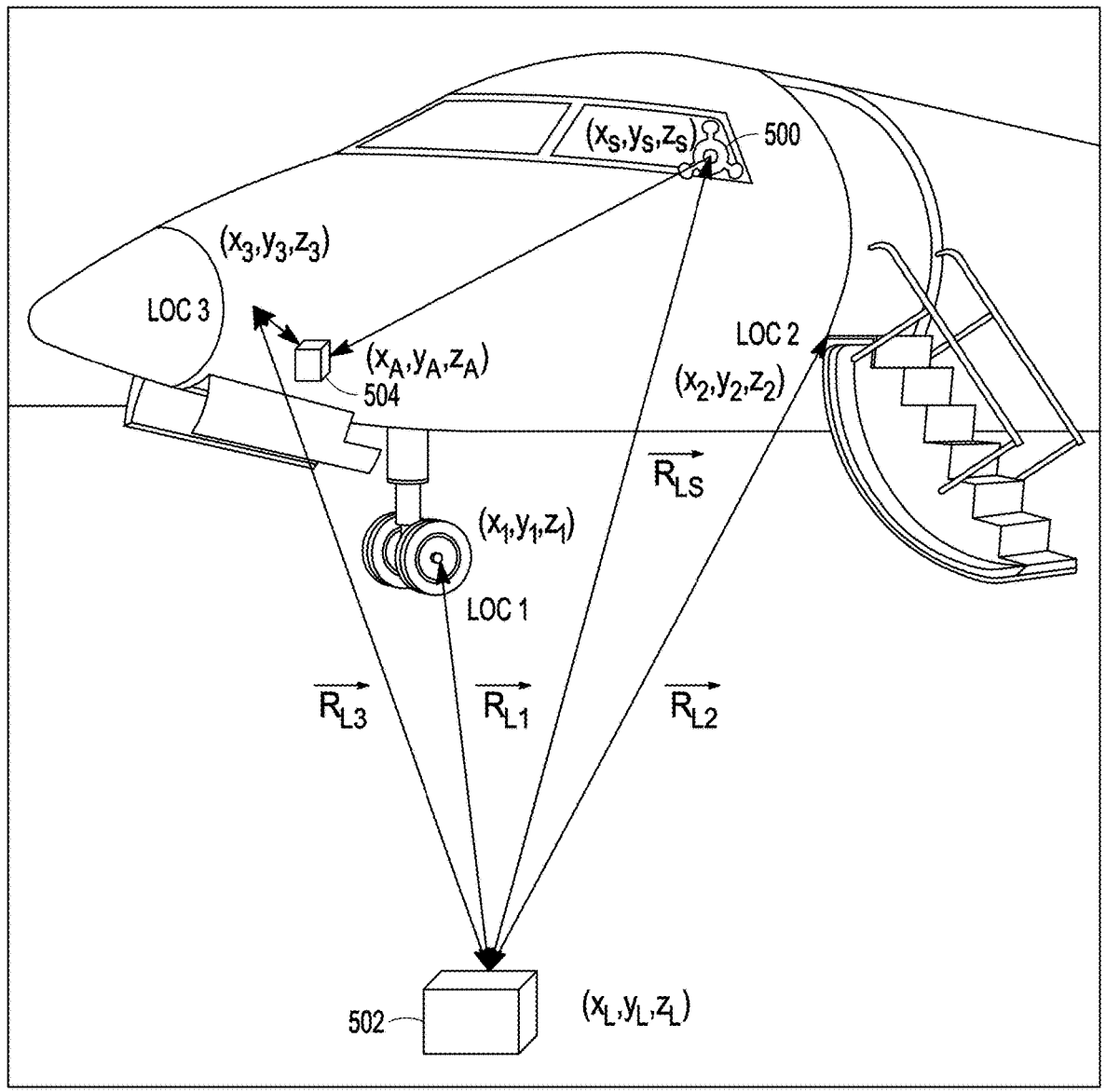
FIG. 16 is an illustration of measurements of a quick-mount LWR installed inside a window of an aircraft to translate the measurements of a threat into an INS coordinate frame.

Referring now to FIG. 16, a self-contained quick-mount LWR 500 needs to be calibrated to aircraft coordinate frames to facilitate geo-location of laser sources based on aircraft location, derived from either GPS or INS. In an embodiment, a laser rangefinder (LRF) 502 is positioned at a fixed location on the ground near the aircraft. The LRF measures range to 3 or more prescribed locations, locating LRF with trilateration. Known offsets between a navigation system 504 and each or the 3 or more prescribed locations can be provided from a CAD model, laser scanning techniques or similar. An Angle of Attack (AoA) reading from the LWR and LRF range enables calculation of the LWR position on the aircraft relative to the INS coordinate frame. The translation could be programmed into the LWR to enable it to geo-locate the laser sources without direct connection to the aircraft.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A self-contained quick-mount laser warning receiver, comprising:
a laser warning receiver (LWR) including a forward-facing aperture having a field-of-view (FOV), an optical detector and a rearward-facing human-machine interface (HMIF); and
a quick release mechanism for mounting the LWR to a flat or curved inner surface of an optically transparent window of a manned platform to position the forward-facing aperture to receive light within the FOV through the optically transparent window and to provide visual or audio warnings of a detected laser source to a human occupant.

2. The self-contained quick-mount laser warning receiver of claim 1, wherein the LWR is configured to detect only continuous wave (CW) laser sources in the visible or NIR/SWIR bands.

3. The self-contained quick-mount laser warning receiver of claim 1, wherein the LWR is configured to detect continuous wave (CW) laser sources and pulsed laser sources in the visible or NIR/SWIR bands.

4. The self-contained quick-mount laser warning receiver of claim 1, wherein the quick release mechanism includes two or more feet rotatably coupled to the LWR.

5. The self-contained quick-mount laser warning receiver of claim 4, wherein each foot is a suction cup including a ball joint coupled to the LWR.

6. The self-contained quick-mount laser warning receiver of claim 1, wherein the quick release mechanism further comprises a first rotational coupler configured to manually rotate the LWR's FOV of the forward-facing aperture and the rearward-facing HMIF.

7. The self-contained quick-mount laser warning receiver of claim 6, wherein the first rotational coupler rotates about the surface normal to the window.

8. The self-contained quick-mount laser warning receiver of claim 6, wherein the first rotational coupler provides a full 3-axis of rotation of the LWR's FOV of the forward-facing aperture and the rearward-facing HMIF.

9. The self-contained quick-mount laser warning receiver of claim 1, wherein the quick release mechanism includes one or more feet coupled to a stationary device platform formed with locking features, wherein said LWR is formed with complementary locking features that allow the LWR to be lifted, rotated about a surface normal to the window and re-engaged with the locking features on the stationary device platform to cylindrically rotate the FOV.

10. The self-contained quick-mount laser warning receiver of claim 1, wherein the quick release mechanism includes a single suction cup including a rotatable mount with a cantilever arm attached to the LWR.

11. The self-contained quick-mount laser warning receiver of claim 1, wherein the quick release mechanism includes at least two feet rotatably coupled to a stationary device platform including a ball joint interface for mounting on the inner surface of the optically transparent window and an optical ball joint that engages the ball joint interface, wherein the optical ball joint rigidly and optically couples the forward-facing aperture to the optical detector to rotate the FOV in three axes.

12. The self-contained quick-mount laser warning receiver of claim 1, wherein the quick release mechanism includes a single suction cup including a mechanical ball joint that engages a ball joint interface on the LWR, wherein the forward-facing aperture is positioned outside of a footprint of the single suction cup to rotate the FOV of the forward-facing aperture and the rearward-facing HMIF in three axes.

13. The self-contained quick-mount laser warning receiver of claim 1, wherein the quick release mechanism includes a single suction cup having a ball joint interface that engages an optical ball joint that rigidly and optically couples the forward-facing aperture to the optical detector and positions the aperture inside a footprint of the single suction cup to rotate the FOV in three axes.

14. The self-contained quick-mount laser warning receiver of claim 1, wherein the quick release mechanism maintains a fixed FOV with respect to a surface normal to the optically transparent window, further comprising a rotational coupler configured to rotate the HMIF about three axes.

15. The self-contained quick-mount laser warning receiver of claim 1, wherein the quick release mechanism includes first and second rotational couplers that allow for independent rotation of the FOV and the HMIF.

16. A self-contained quick-mount laser warning receiver, comprising:
a laser warning receiver (LWR) including a forward-facing aperture having a field-of-view (FOV), an optical detector and a rearward-facing human-machine interface (HMIF); and
a quick release mechanism including at least two feet rotatably coupled to a stationary device platform including a ball joint interface for mounting to a flat or curved inner surface of an optically transparent window of a manned platform to position the forward-facing aperture to receive light within the FOV through the optically transparent window and to provide visual or audio warnings of a detected laser source to a human occupant; and
an optical ball-joint positioned in the ball joint interface to rigidly and optically couple the forward-facing aperture to the optical detector, said optical ball-joint configured to manually rotate the LWR to point the FOV.

17. A self-contained quick-mount laser warning receiver, comprising:
a laser warning receiver (LWR) including a forward-facing aperture having a field-of-view (FOV), an optical detector, a battery and a rearward-facing human-machine interface (HMIF); and
a quick release mechanism including a single suction cup having a centrally located ball joint for mounting to a flat or curved inner surface of an optically transparent window of a manned platform,
a device package that includes a ball joint interface that is coupled to the ball joint, wherein within the device package the rear-ward facing HMIF is mounted on a rear facing side of the ball joint interface, the optical detector is offset from one side of the ball joint within the forward-facing aperture and outside a footprint of the single suction cup and the battery is offset to an opposing side of the ball joint to balance the LWR;
wherein the device package can be manually rotated about a Z-axis through the suction cup and normal to the optically transparent window and about X and Y axes orthogonal to the Z-axis to point the FOV in the forward-facing aperture and the rear-ward facing HMIF to receive light within the FOV through the optically transparent window to the optical detector and to provide visual or audio warnings of a detected laser source to a human occupant.

18. The self-contained quick-mount laser warning receiver of claim 17, wherein the LWR is configured to detect only continuous wave (CW) laser sources in the visible or NIR/SWIR bands.

19. The self-contained quick-mount laser warning receiver of claim 17, wherein the LWR is configured to detect continuous wave (CW) laser sources and pulsed laser sources in the visible or NIR/SWIR bands.

* * * * *

UNITED STATES PATENT AND TRADEMARK OFFICE
CERTIFICATE OF CORRECTION

| | | |
|---|---|---|
| PATENT NO. | : 12,253,627 B2 | Page 1 of 1 |
| APPLICATION NO. | : 17/961185 | |
| DATED | : March 18, 2025 | |
| INVENTOR(S) | : Sean D. Keller | |

It is certified that error appears in the above-identified patent and that said Letters Patent is hereby corrected as shown below:

In the Specification

In Column 4, Line 30, delete "fixed:" and insert --fixed;-- therefor

Signed and Sealed this
Thirtieth Day of December, 2025

John A. Squires
*Director of the United States Patent and Trademark Office*